United States Patent

Müller et al.

[11] Patent Number: 5,823,271
[45] Date of Patent: Oct. 20, 1998

[54] LIFTING ROD FOR THE THREE-POINT ATTACHING DEVICE OF A TRACTOR

[75] Inventors: Norbert Müller, Ruppichteroth; Herbert Coenen, Königswinter; Jürgen Vollmer, Lohmar, all of Germany

[73] Assignee: GKN Walterscheid GmbH, Lohmar, Germany

[21] Appl. No.: 799,137

[22] Filed: Feb. 13, 1997

[30] Foreign Application Priority Data

Feb. 15, 1996 [DE] Germany ............. 196 05 560.1

[51] Int. Cl.⁶ ................................. A01B 59/043
[52] U.S. Cl. ............... 172/450; 172/457; 280/455.1; 280/474
[58] Field of Search ...................... 172/439, 450, 172/457, 272, 275, 443, 47; 280/455.1, 474, 460.1; 403/377, 379, 327, 330, 378; 74/586; 292/262, 273, 277, 338, 339

[56] References Cited

U.S. PATENT DOCUMENTS

| | | |
|---|---|---|
| 2,541,964 | 2/1951 | Hennings . |
| 3,056,458 | 10/1962 | Gray ........................................ 172/448 |
| 3,434,737 | 3/1969 | Bailey et al. ........................... 172/450 |
| 3,643,976 | 2/1972 | Haupt et al. ........................ 172/439 X |
| 3,731,951 | 5/1973 | Gruenberger . |
| 4,418,935 | 12/1983 | O'Connor ............................... 172/439 |
| 4,862,971 | 9/1989 | Azzarello et al. .................. 280/474 X |
| 4,865,134 | 9/1989 | Rugen et al. ........................... 172/450 |
| 4,917,406 | 4/1990 | Herchenbach et al. ............. 280/474 X |
| 5,042,588 | 8/1991 | Herchenbach et al. ................ 172/439 |
| 5,076,369 | 12/1991 | Herchenbach .......................... 172/439 |
| 5,327,978 | 7/1994 | Bremner ................................ 172/439 |
| 5,361,850 | 11/1994 | Muller et al. ....................... 172/439 X |
| 5,462,303 | 10/1995 | Langen et al. ....................... 280/455.1 |

FOREIGN PATENT DOCUMENTS

| | | |
|---|---|---|
| 1202370 | 1/1960 | France . |
| 2622761 | 5/1989 | France . |
| 1109933 | 6/1961 | Germany . |
| 1138696 | 10/1962 | Germany . |
| 1238706 | 4/1967 | Germany . |
| 1457675 | 4/1969 | Germany . |
| 41 35 809 | 3/1993 | Germany . |

Primary Examiner—Terry Lee Melius
Assistant Examiner—Victor Batson
Attorney, Agent, or Firm—Harness, Dickey & Pierce, P.L.C.

[57] ABSTRACT

A lifting rod for the lower steering arm of a tractor, at the ends of the lifting rod, has connecting elements in the form of a connecting yoke 6 and a ball joint 7. The connecting yoke 6, via a threaded rod 9, is threaded into a threaded bore 10 of a tubular rod element 11. The rod element 11 is received in the housing bore 21 of the housing 8 and is movable along the longitudinal axis 17. The rod element 11 and the housing 8 are able to assume two different positions relative to one another, with the lifting rod length being fixed in one of the two positions. In the other position, both may assume a floating relationship relative to one another. To allow the lifting rod length to be set even when the lifting rod is in the mounted condition and to ensure that both parts do not change their respective positions even when in use, it is proposed that in the rigid position, the plug-in pin 24 engages a recess 13 in the rod element, so that support is provided in the shortening direction and in the direction of rotation, whereas for the direction of extraction stops are provided to prevent any lengthening. After the plug-in pin 24 has been extracted, the rod element 11 can be turned by 90°, to enable the plug-in pin to pass through the slot 14 in the rod element 11. The lifting rod length is shortened, however rotation is prevented.

10 Claims, 4 Drawing Sheets

LIFTING ROD FOR THE THREE-POINT ATTACHING DEVICE OF A TRACTOR

BACKGROUND OF THE INVENTION

The invention relates to a lifting rod to connect a lower steering arm of a three-point attaching device of a tractor to a lifting arm of the tractor. The lifting rod has a first connecting element connected to the lifting arm of the tractor. A second connecting element is connected to the lower steering arm of the tractor. A housing includes a bore to receive a rod element in the bore. The rod element is adjustable along a longitudinal axis. The housing and rod element each are associated with one of the connecting elements. A mechanism sets the rod element relative to the housing to a fixed length. The mechanism includes a plug-in pin and a plug-in bore in the housing. The pin and bore are effective in one direction. Stops at the housing and at the rod element are effective in the other direction. Also, a second mechanism sets the fixed lifting rod length. The second mechanism includes a threaded connection.

A lifting rod is described in U.S. Pat. No. 3,056,458. The housing has a guiding sleeve which is attached to the open housing end. The rod element projects from the sleeve and serves to guide the rod element. A further guiding sleeve is attached at the end of the rod element which enters the housing. The rod element is threaded into a threaded bore of the guiding sleeve. In this way, it is possible to set the fixed length of the lifting rod and the rod element is rotated relative to the guiding sleeve. The guiding sleeve associated with the rod element is secured between the guiding sleeve associated with the housing and the plug-in pin which passes through bores of the housing. To achieve a floating position, the plug-in pin is pulled out of the housing, so that the rod element, by its end which enters the housing, is adjustable along the longitudinal axis. To set the fixed length, the connecting element, in the form of a yoke head associated with the rod element, is released from the lower steering arm.

Thereafter, the rod element may be rotated around the longitudinal axis on condition, however, the guiding sleeve itself associated with the rod element does not rotate around the longitudinal axis. Furthermore, there is a risk that, if vibrations occur during operation, the setting changes because the guiding sleeve is able to rotate freely on the thread of the rod element.

SUMMARY OF THE INVENTION

It is the object of the invention to provide a lifting rod where it is possible to set the fixed lifting rod length without releasing one of the connecting elements from the tractor or the lifting arm of the tractor or from the lower steering arm. Furthermore, the invention ensures that once the length is set it does not change during operation.

In accordance with the invention, at least at one end projecting from the housing, the rod element includes a threaded bore portion which is adjustably engaged by an external thread of a threaded rod. The threaded rod is connected to one of the connecting elements. The bore portion and the threaded rod constitute the means for setting the fixed lifting rod length. The rod element end entering the housing includes a recess or bore. A plug-in pin is inserted into the plug-in bore of the housing. Thus, the rod element is fixed relative to the housing. Furthermore, the rod element, at that end, includes a slot which is offset relative to the recess or bore around the longitudinal axis. The recess or bore extends along the longitudinal axis. It is possible to insert the plug-in pin after the rod element has been turned accordingly relative to the housing.

An advantage of this embodiment is that merely by removing the plug-in pin, it becomes possible to rotate the rod element at the connecting element while the connecting element is held at the lower steering arm. Also, rotation of the threaded rod results in a change in length. Once the plug-in pin is inserted, the length can no longer be changed for the two positions in which the rod element can be fixed relative to the housing. Both in the rigid position and in the floating position, the rod element is non-rotatably held relative to the housing by the plug-in pin.

Furthermore, the change-over from the floating position to the rigid position and vice versa is easy to handle. Due to the arrangement, it is possible to achieve short lengths. The length of the slot is such that the desired axial adjustment of the rod element relative to the housing can take place along the longitudinal axis. In a preferred embodiment, the recesses and the slot are open towards the end face of the rod element, which enters the housing. The rod element may be a solid material which is drilled to be hollow at the end engaged by the threaded rod or, to achieve lightweight embodiment, it may be a tube.

Furthermore, to limit the movement in the extracting direction, the rod element is associated with at least one guiding ring which is supported directly on a further stop associated with the housing. However, to bridge the distance, the guiding ring associated with the rod element may also be supported on a bush arranged in front of the stop of the housing. The rod element is preferably associated with two spaced guiding rings attached to the rod element. The guiding rings may be attached to the rod element so as to be movable in the one direction while being fixed by securing rings in the other direction. The arrangement preferably is such that the guiding rings are each secured by a securing ring at the housing and at the rod element, respectively, so as to be effective in opposite directions. A pressure ring is supported between the two guiding rings. The pressure ring, in the rigid position and in the floating position, holds the guiding rings in contact with the securing rings. Alternatively, it is possible to connect the guiding rings firmly with the rod element. In a particularly advantageous embodiment, the rod element is provided in the form of a tube. To facilitate the rotation of the rod element to set the fixed lifting rod length, the outer face of the rod element includes a tongue radially projecting to the longitudinal axis. Normally, one of the connecting elements includes a ball joint whereas the other one forms a connecting yoke.

From the following detailed description, taken in conjunction with the accompanying drawings and subjoined claims, other objects and advantages of the present invention will become apparent to those skilled in the art.

BRIEF DESCRIPTION OF THE DRAWINGS

The lifting rod in accordance with the invention and its use in connection with a three-point attaching device of a tractor is shown in the drawing wherein.

DETAILED DESCRIPTION OF THE DRAWINGS

Figure 1:
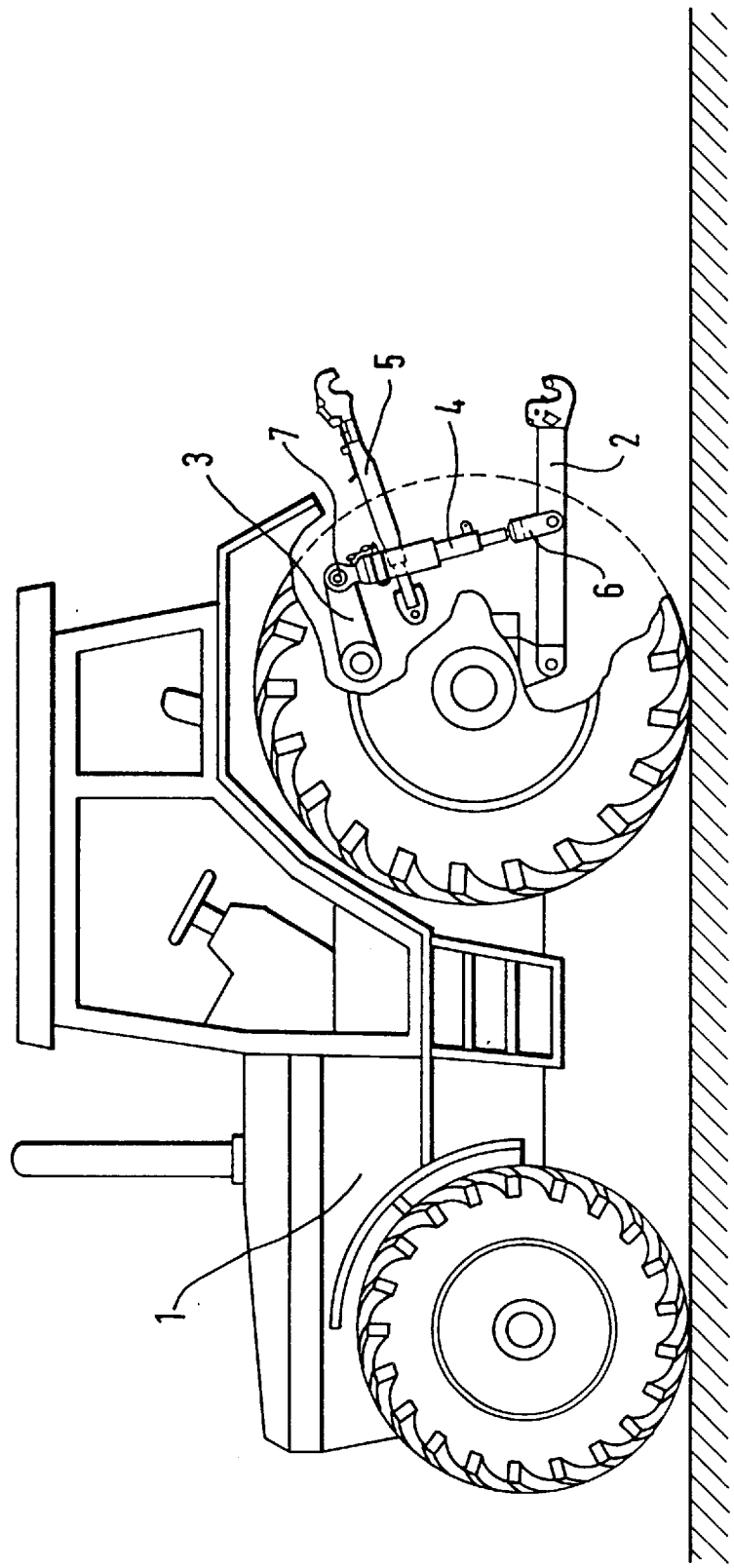
FIG. 1 is a side elevation view of a tractor with a three-point attaching device with a lifting rod in accordance with the invention.

FIG. 1 shows a tractor 1 whose rear end includes a lower steering arm 2. The lower steering arm is attached such that one of its ends is pivotable. A further lower steering arm is attached in parallel to the visible lower steering arm 2. One end of the upper steering arm 5 is above and between the two, which is pivotably articulated at the tractor rear. The lower steering arms 2 and the upper steering arm 5 serve to attach an implement to the tractor 1.

To move the implement attached to the lower steering arm 2, it is articulated at the lifting arm 3 by means of a lifting rod 4. The lifting arm 3 is connected to a power drive by means of which it may be raised and lowered. The lower steering arm 2 is raised and lowered as well by the lifting rod 4. A connecting yoke 6 is provided to connect the lifting rod 4 to the lower steering arm 2. Furthermore, the lifting rod 4 is connected to the lifting arm 3 by a ball joint 7.

Figure 2:
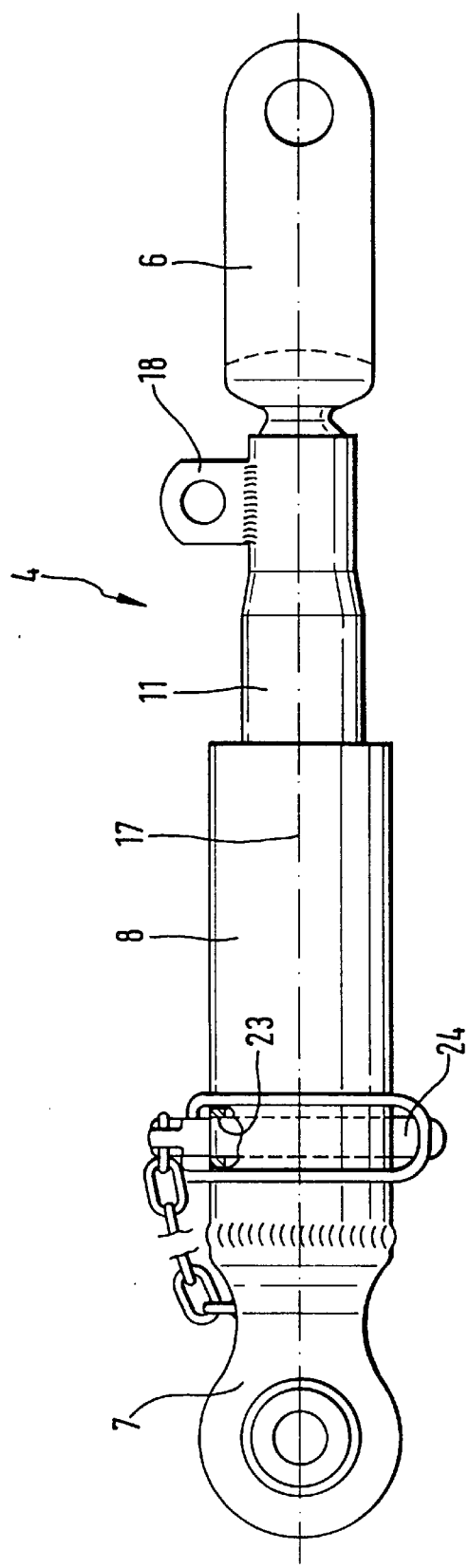
FIG. 2 is a side elevation of the lifting rod.

In FIG. 2, the lifting rod 4 is shown in a larger scale relative to FIG. 1. The lifting rod 4 includes a rod element 11 carrying the connecting yoke 6, and the housing 8 with which the ball joint 7. The rod element 11 is adjustable in the housing 8 along the longitudinal axis 17. However, the rod element 11 may also be set to a fixed length by a plug-in pin 24 which is inserted into a bore 23 in the housing 8. The fixed length of the lifting rod may be set by the rod element 11 connected to the connecting yoke 6 by a threaded connection. The setting is achieved by turning the rod element 11 by acting on the tongue 18. This will be explained in greater detail in connection with FIG. 3.

Figure 3:
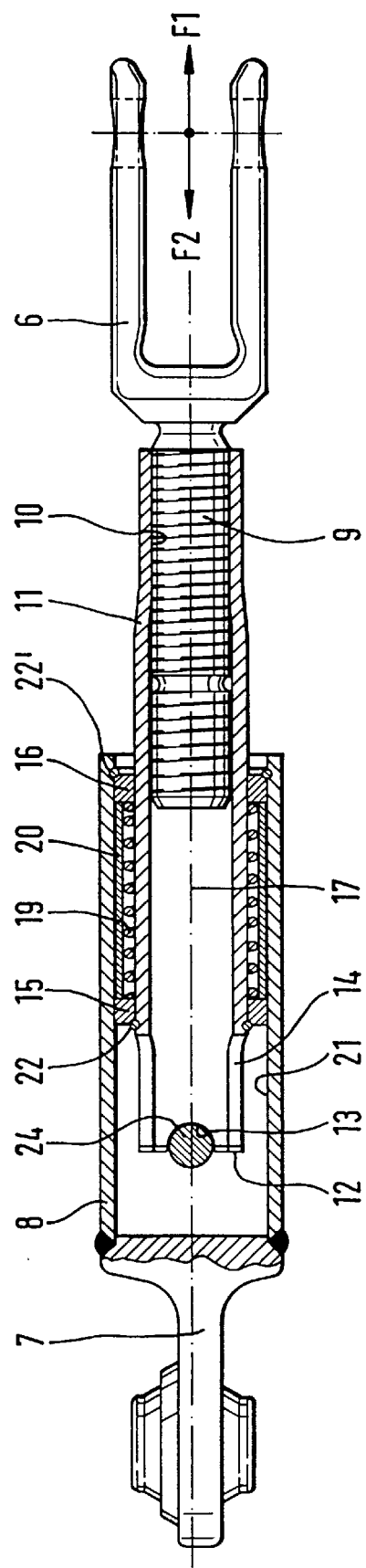
FIG. 3 is a partial cross-section view of FIG. 2, with the lifting rod in the rigid position.

FIG. 3 illustrates the connecting yoke 6 with a threaded rod 9. The threaded rod 9, via its threads, is threaded into a threaded bore 10 of the tubular rod element 11. The rod element 11 axially extends into the bore 21 of the housing 8. Starting from the end face 12 of the rod element 11, which end face enters the bore 21 of the housing 8. A recess 13 is provided which is open towards the end face 12. The recess 13 is adapted to the cross-section of the plug-in pin 24. The pin 24 extends transversely to the longitudinal axis 17.

The rod element 11 is associated with two guiding rings 15, 16. The guiding rings 15, 16 are arranged at a distance from one another. The guiding ring 15 is positioned on the outer face of the rod element 11 and is supported towards the ball joint 7 on a securing ring 22. The second guiding ring 16 is arranged towards the open end of the housing 8 on the outer face of the rod element 11 and is supported towards the connecting yoke 6 on the securing ring 22' which engages a groove in the housing bore 21.

A pressure ring 19 is supported between the two guiding rings 15, 16. The pressure ring 19 is arranged coaxially around the rod element 11. A bushing 20 is arranged between the two guiding rings 15, 16. When a force is introduced in the direction F1 towards the connecting yoke 6, the force is transmitted through the threaded rod 9 onto the rod element 11. The force in turn is transmitted from the securing ring 22 onto the guiding ring 15. From there, the force is transmitted through the bushing 20 and the guiding ring 19 onto the securing ring 22'. The force is then transmitted into the housing 8 and the ball joint 7, making it impossible to lengthen the lifting rod.

When a force F2 is applied in the direction opposite thereto, it is transmitted through the connecting yoke 6 onto the threaded rod 9 and to the rod element 11. The force in turn is transmitted through the plug-in pin 24 onto the housing 8 and the ball joint 7, so that the lifting rod length cannot be shortened. Further, it is not possible for the rod element 11 to be operated in the sense of rotating it around the longitudinal axis 17 because when the lifting rod is mounted as shown in FIG. 1, the connecting yoke 6 and the housing 8 are rotatable relative to one another only within the limits of movement of the ball joint 7.

Figure 4:
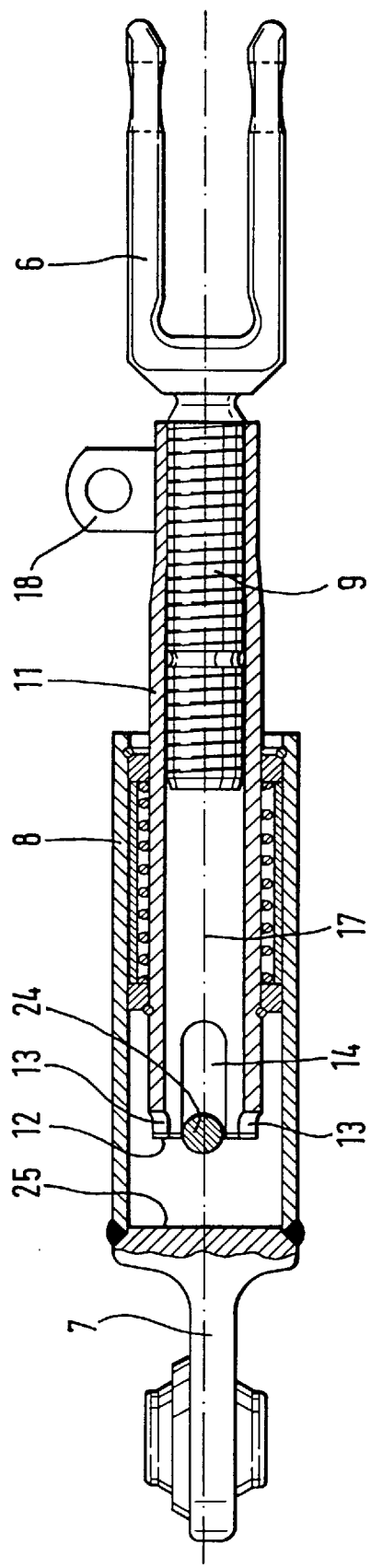
FIG. 4 is a view like FIG. 3 with the lifting rod in the floating position.

The rod element 11 is held by the plug-in pin 24. The pin 24 engages the recess 13 in such a way that it is non-rotatable relative to the housing 8. This means that no adjustment is possible on the threaded rod 9. Starting from the end face 12, the tubular rod element 11 is provided with a slot 14 offset by 90° relative to the recess 13 around the longitudinal axis 17. To move the rod element 11 and housing 8 into a position where the rigid position as shown in FIG. 3 is abandoned and wherein an axial adjustment of the rod element 11 and housing 8 relative to one another along the longitudinal axis is possible, the plug-in pin 24 is extracted from the recess 13 and the plug-in bore 23 of the housing 8. Subsequently, as a result of the tongue 18 being acted upon, the rod element 11 is turned by 90° into the position shown in FIG. 4. Thereafter, the plug-in pin 24 can be reinserted into the bore 23 of the housing 8 and pass through the slot 14 in order to emerge from the other end of the bore 23 in the housing 8. In this position, with a force being applied to the connecting yoke 6 in the direction F2, according to FIG. 3, the lifting rod length can be shortened. The rod element 11 is moved further into the housing 8 until, depending on dimensions, the end face 12 of the rod element 11 comes to rest against the base 25 or until the end of the slot 14 contacts the plug-in pin 24. If a force is applied to the connecting yoke 6 in a direction corresponding to direction F1, the conditions are the same as described in connection with FIG. 3.

While the above detailed description describes the preferred embodiment of the present invention, the invention is susceptible to modification, variation and alteration without deviating from the scope and fair meaning of the subjoined claims.

We claim:

1. A lifting rod for connecting a lower steering arm of a three-point attaching device of a tractor to a lifting arm of the tractor, comprising:

a first connecting element to be connected to the lifting arm of the tractor and a second connecting element to be connected to the lower steering arm of the tractor;

a housing and a rod element received in a bore in the housing, said rod element being adjustable along a longitudinal axis, said housing and said rod element each being associated with one of the connecting elements;

means for setting the rod element relative to the housing to a fixed length, said setting means including a plug-in pin and a plug-in bore in the housing which are effective in one direction;

stops at the housing and at the rod element being effective in the other direction;

means for setting the fixed lifting rod length, said setting means including a threaded connection;

at least at one end projecting from the housing, said rod element including a threaded bore portion which is adjustably engaged by a threaded rod by external thread of the rod, said threaded rod being connected to one of the connecting elements, the bore portion and the threaded rod being the means for setting the fixed lifting rod length;

the rod element having an end entering the housing is provided with a recess or bore in said end through which extends the plug-in pin inserted into the plug-in bore of the housing, the pin fixing the rod element relative to the housing, and the rod element, at said end, including a slot, which is offset relative to the recess or bore around the longitudinal axis, and which extends along the longitudinal axis and into which it is possible to insert the plug-in pin after the rod element has been turned accordingly relative to the housing.

2. A lifting rod according to claim 1, wherein the recess and slot are open towards the end face of the rod element which enters the housing.

3. A lifting rod according to claim 1, wherein to limit movement in the extracting direction, the rod element is associated with at least one guiding ring which is intended either to be supported directly on a stop associated with the housing or indirectly via a bushing arranged therebetween.

4. A lifting rod according to claim 3, wherein the rod element is associated with two spaced guiding rings.

5. A lifting rod according to claim 3, wherein the guiding rings are each secured by a securing ring at the housing and at the rod element respectively in opposite directions.

6. A lifting rod according to claim 3, wherein a pressure spring is supported between two guiding rings.

7. A lifting rod according to claim 4, wherein the guiding rings are firmly connected to the rod element.

8. A lifting rod according to claim 1, wherein the rod element is a tube.

9. A lifting rod according to claim 1, wherein with reference to the longitudinal axis, a tongue projects radially from the outer face of the rod element.

10. A lifting rod according to claim 1, wherein one of the connecting elements is provided in the form of a ball joint and the other one in the form of a connecting yoke.

* * * * *